United States Patent [19]  [11] 4,278,638
Nilsson et al.  [45] Jul. 14, 1981

[54] GAS GENERATOR CONSTRUCTION

[75] Inventors: Karl E. Nilsson, Ottobrunn; Armin Lampert, Aschheim, both of Fed. Rep. of Germany

[73] Assignee: Messerschmitt-Bolkow-Blohm GmbH, Fed. Rep. of Germany

[21] Appl. No.: 139,359

[22] Filed: Apr. 11, 1980

[30] Foreign Application Priority Data

Apr. 14, 1979 [DE] Fed. Rep. of Germany ....... 2915202

[51] Int. Cl.³ .......................... B01J 1/00; B60R 21/00
[52] U.S. Cl. .................................... 422/166; 422/165; 422/126; 280/731; 280/736
[58] Field of Search .................. 280/741, 736, 731; 102/39; 55/387; 422/120, 122, 123, 125, 126, 165, 166

[56] References Cited

U.S. PATENT DOCUMENTS 3,985,076  10/1976  Schneiter et al. ................. 102/39

Primary Examiner—William F. Smith
Assistant Examiner—Chris Konkol
Attorney, Agent, or Firm—McGlew and Tuttle

[57] ABSTRACT

A gas generator construction particularly for the inflation of inflatable protective bags which are used in safety systems of vehicles comprises a housing with a central tubular housing part which contains an ignition device that is surrounded by a reaction chamber containing a gas generating charge which in turn is surrounded by an outer filter housing. The gases which are generated in the reaction chamber are directed through openings and into the filter housing and then outwardly through slots of the filter housing for use in expanding the protective bag. The reaction chamber and the filter chamber are formed by an annular substantially S-shaped wall member which has a bottom forming wall portion for the reaction chamber which is joined to the central tubular part, for example, by welding. The S-shaped wall member includes a division wall between the reaction chamber and the filter chamber and an outer casing portion forming a cylindrical outer wall which is connected to the division wall between the two chambers by a curved web portion of the S-shaped wall. A dome shaped cover is employed to enclose the reaction chamber and a cover ring is used to enclose the filter housing. Each are connected to the intermediate wall portion of the S-shaped member.

7 Claims, 1 Drawing Figure

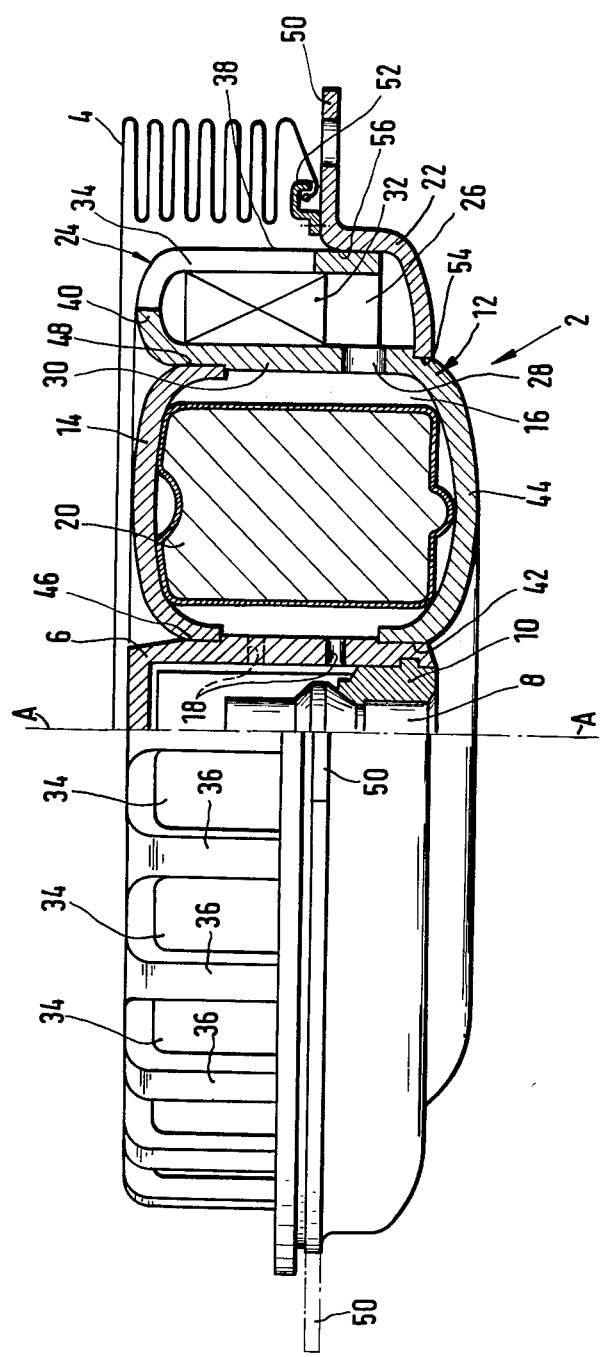

GAS GENERATOR CONSTRUCTION

FIELD AND BACKGROUND OF THE INVENTION

This invention relates in general to gas generator construction and in particular to a new and useful gas generator housing construction particularly for generating gases for filling protective bags of vehicle safety systems.

Prior art gas generators in sheet-metal construction for inflatable safety bags which must withstand enormous thermal and mechanical stresses within a short period of time comprise as their main component parts a substantially circular, cylindrical reaction chamber which is bounded by a casing and a cover screwed thereto, and is equipped with a central ignition device, and a filter chamber adjoining and encircling the reaction chamber on the outside having a substantially rectangular cross section and being formed by two sheet metal parts which are flanged together and secured to the cover or the casing by locking engagement. Gas generators of this kind, however, are very heavy because of the thick-walled casing and cover needed for reasons of resistance, and they are relatively complicated and expensive in spite of the sheet metal construction, which is a serious disadvantage primarily in the large-scale production of such generators. In addition, the radially extending ports in the thin-walled sheet-metal parts bounding the filter chamber must be made, also for reasons of resistance, sufficiently small to obtain a smaller cross-sectional area and a high speed outflow of the gas, which results in locally excessive thermal and compressive stresses in the safety bag portions exposed to the pressure gas jets.

By contrast therewith in gas generators of the mentioned kind which operate with an axial pressure gas conduction and a corresponding axial tandem arrangement of the reaction and filter chambers, a high-grade mutual reinforcement of the supporting casing parts bounding the reaction chamber and, consequently, an appreciable reduction of the wall thicknesses as compared to reaction chambers having comparable dimensions is obtained by anchoring the toroidal casing and the apertured cover to the central tube and by the materially integral edge joints, preferably formed by electron-beam welds. Nevertheless, in this design, the weight proportion of the supporting casing parts in the total weight of the gas generator is undesirably high.

SUMMARY OF THE INVENTION

The invention is directed to a gas generator which, while being designed to exhibit a higher mechanical resistance and improved gas flow conditions, and having a considerably reduced net weight, can be manufactured on a large scale and inexpensively.

In accordance with the invention, a gas generator comprises an inner central tubular casing part which is adapted to contain an ignitor which has an outer wall which is joined to a substantially S-shaped annular part which forms a bottom and intermediate wall of a reaction chamber and an enclosed wall of a filter chamber portion connected to the reaction chamber and which further includes a cover member connected between the central tubular portion and the intermediate wall and enclosing the reaction chamber and a cover ring connected between the outer casing wall portion of the S-shaped member and the intermediate wall. The outer covering advantageously carries a retaining ring which is secured to the periphery of an inflatable bag which is arranged to overlie the casing in a position to receive gases discharged to slots of the outer casing wall portion.

As compared to prior art generators with identical reaction chamber volumes and overall dimensions, the determinative parameters and, particularly, the critical dimensions of the reaction chamber of the inventive generator are substantially improved by the radial association of the reaction and expansion chambers and the S-shaped cross section of the casing extending beyond the reaction chamber. A central anchoring of the casing and the cover, and a generator construction highly stable in shape is obtained which comprises three concentric circular walls connected to each other through respective arcuate wall portions, namely the central tube forming the inner circular wall, the casing portion extending between the reaction chamber and the expansion chamber and forming the intermediate circular wall, and the extended casing portion bounding the filter chamber radially to the outside and forming the outer circular wall. The construction is such that generally a considerable reduction of the wall thicknesses, and a material better weight distribution resulting in superior strength are ensured. Thus not only a small weight is obtained, but also conditions for manufacturing the gas generator on a large scale are created, due to the punching of slot-shaped, large-area ports in the extension of the casing which is integral therewith and has the same wall thickness. The extension is adapted to the lower pressures in the expansion or filter chamber. Rib-like webs remain between the ports which have cross-sections highly resistant to bending under outwardly directed pressures, and due to the larger cross-sectional areas of the ports, the gas flow conditions downstream of the expansion chamber are substantially improved. The fact that the ports are punched in the casing, in advance, or during the cold forming operation, and that the extension bounding the filter chamber is formed in one piece with the casing, has the further effect of facilitating the manufacture of the gas generator and of rendering it less expensive. Therefore, in view of the low weight, favorable gas flow conditions, and space saving geometry, the inventive gas generator is excellently suited for an economical series production and particularly for producing the gas for inflating car safety bags.

According to an advantageous development of the invention, the extended casing portion has preferably a substantially U-shaped cross-section and bounds the expansion chamber on three sides, whereby the mechanical resistance of the casing is further increased and a sufficient wall area for punching large ports is obtained. For reasons of safety, and to protect the operated device mounted downstream, it is advisable to provide the mid web of the U-shape casing portion on the side facing the operated device, and to extend the slots forming the ports into this mid-web so as to further enlarge the passage area of the ports and/or to modify the discharge direction of the pressure gas from the expansion chamber, i.e. give the gases another than purely radial direction. The manufacture of the casing may further be simplified, while avoiding a subsequent cutting of the ports, by designing the casing, preferably, as a sheet-metal part which is formed in a deep-drawing operation, with the ports being punched in advance or simultaneously. To increase the mechanical resistance, all the edge connections between the S-shaped casing, the cover, and the central tube are advantageously provided in the form of materially integral rigid edge joints. In another design giving the casing parts exposed to the highest pressures a particularly resistant shape, the cover and the casing walls bounding the reaction chamber form together a toroidal structure having a substantially circular cross section.

Accordingly, it is an object of the invention to provide a gas generator particularly for the inflation of inflatable bags for the safety systems of vehicles which comprises a central tubular part having a cylindrical outer wall, an annular substantially S-shaped wall member which has a bottom forming wall portion, an intermediate wall portion connected to the bottom forming wall portion, an outer cylindrical casing wall portion and a web wall portion connected between the intermediate wall portion and the outer cylindrical casing wall portion and wherein the bottom forming wall portion has an inner edge joined to the lower part of the cylindrical tubular part further including an annular cover member having respective radially inner and radially outer peripheral edge portions joined to the central tubular part and to said intermediate wall portion respectively and enclosing a reaction chamber therebetween overlying said bottom forming wall portion, and wherein an outer covering extends between and is joined to the intermediate wall portion and the outer cylindrical casing wall portion and encloses a filter chamber therein, said outer cylindrical casing wall portion having a plurality of openings therein for the outflow of generated gases and the intermediate wall portion having an opening therein communicating the reaction chamber with the filter chamber for the flow of reaction gases from the reaction chamber into the filter chamber and then out to the openings in the outer cylindrical wall portion.

A further object of the invention, is to provide a gas generator particularly for the inflation of inflatable protective bags in vehicle safety systems which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a partial side elevational and partial sectional view of a gas generator for a protective bag system constructed in accordance with the invention.

DESCRIPTION OF THE PREFERRED EMBODIMENT

Referring to the drawing in particular, the invention embodied therein comprises a gas generator particularly for the inflation of an inflatable protective bag or safety bag 4 for use in vehicles such as automobiles. In accordance with the invention, the gas generator includes a central tubular part 6 which is adapted to contain for example, an ignitor 8 mounted on a support 10 of the central tubular part. The ignitor 8 is capable of generating ignition gases which pass through openings 18 of the outer cylindrical wall of the cylindrical tubular part 6 into a reaction chamber containing gas generating charge 20 which will be ignited by the ignition gases. The gases which are formed then pass outwardly through openings 28 into a filter or expansion chamber 26 containing a filter 32. Gases are then discharged from the filter chamber 26 through a plurality of circumferentially spaced ports or openings 34 directly into the interior of the safety bag 4.

The gas generator 2 which is covered on its top by a folded, inflatable safety bag 4, forms a part of an impact cushioning system for car occupants, including, in addition, an accident sensor (not shown). The generator is accommodated, for example, in the steering wheel of a passenger car. However, the invention is not limited to this application and may generally be applied to any generation of pressure or propellant gas, for example, for inflating rubber boats.

The gas generator 2 substantially comprises a central tube 6 which is closed on its top and intended for receiving an ignition device 8 which is primed, for example, electrically e.g. by an accident sensor of an automobile. A support 10 for the ignitor 8 is secured to the lower end of the central tube 6, for example, by flanging, a rotationally symmetrical casing part generally designated 12 disposed concentrically about the central axis A—A and having an S-shape cross section with an annular cover 14 having an arcuate cross section and extending between the central tube 6 and casing part 12. The cover 14 bounds along with the casing part 12, a toroidal reaction chamber 16 accommodating a propellant charge 20, in the form of granules or tablets, for example, to be ignited by the ignition device 8 which generates igniting gases which flow through radial apertures 18 provided in the central tube 6, and an outer cover ring 22 of smaller wall thickness.

A casing wall portion 24 has a U-shape cross-section and forms an arcuate extension of casing 12 extending beyond reaction chamber 16, and together with the cover ring 22 bounds outwardly the expansion or filter chamber 26. The chamber 26 adjoins and encircles reaction chamber 16 and hot reaction gases from reaction chamber 16 are discharged through apertures 28 which are provided in an intermediate wall portion 30 of the casing part 12 extending between the reaction chamber 16 and the expansion chamber 26. The gases escape through a filter 32 accommodated in the expansion chamber 26 and then, appreciably expanded pass through ports 34 provided in the outer casing part 24 into safety bag 4.

Ports 34 are designed as slots with a large passage area which are provided in the substantially cylindrical wall portion 38 of outer casing part 24 bounding the reaction chamber 16 radially to the outside. The ports 34 are separated from each other by webs 36 which are uniformly distributed over the circumference. Ports 34 extend up into a mid-web wall portion 40 of this extended casing part 24 facing in the direction of the safety bag 4. The propellant gas is discharged from the expansion chamber 26 through every port 34 as diverging jets having large cross sections and a correspondingly low velocity so that large areas of the wall of the safety bag 4 are directly exposed to the jets during inflation, and local excess pressures and thermal stresses in the bag are prevented.

An edge joint 42 between the bottom end of the central tube 6 and an inner arcuate bottom forming wall portion 44, of the casing part 12 as well as the edge joint 46 between central tube 6 and the inner edge of cover 14, and the edge joint 48 between the outer edge of the cover and the intermediate wall portion 30 are all materially integral, rigid edge joints in the form of continuous circular welds, for example, electron-beam welds. The cover ring 22 is provided with a plurality of circumferentially spaced fastening lugs 50 distributed around the periphery to which the inner edge beading of the safety bag is secured by a retaining ring 52 having a channel cross section mounted on the ring 22. The ring 22 is also integrally connected to the outer periphery of the inner wall portion 44 and to the radially external cylindrical wall portion 38 of casing extension 24, by welds 54 and 56, respectively. Again in support of a high structural stiffness, cover 14 and the inner casing wall portion 44 form parts of a toroidal structure having an approximately circular cross section, and the entire supporting structure of gas generator 2 comprises three substantially cylindrical ring walls which are concentrical with respect to the central axis A—A; namely the cylindrical wall of central tube 6, the intermediate casing wall portion 30, and the radially outer cylindrical wall portion 38, in which the ports 34 are provided. The three ring walls are connected to each other by curved joining portions or parts which are either integrally formed thereon or joined thereto, namely the cover 14, the inner casing wall portion 44, the mid-web wall 40, and the outer cover ring 22.

As already mentioned, the described design of gas generator 2 makes it possible to considerably reduce the wall thicknesses. For example, in an embodiment in practice, a gas generator 2 having an overall height of about 35 mm, and in which the central tube 6 has a diameter of about 20 mm, the intermediate casing wall portion 30 has a diameter of about 80 mm, and the radially outer cylindrical casing wall portion 38 limiting the expansion chamber 26 has a diameter of about 105 mm. Also, with metal sheets of average quality cover 14 and casing 12 have throughout a wall thickness of only about 2.5 mm, and the less stressed cover ring 22 a thickness of about 1.5 mm. All casing parts can be manufactured in a simple way as cold-formed-metal parts, and need in any case but little finish machining. Cover 14 and cover ring 22 are simply formed stampings, and the entire casing 12 is also formed from a flat sheet as a single-piece deep drawn part, with the ports 34 and maybe apertures 28 being punched in the sheet prior to or during the deep-drawing operation, so that there is no subsequent machining operation. For reasons of safety, ignition device 8 is inserted into central tube 6 only upon assembling the casing parts.

While a specific embodiment of the invention has been shown and described in detail to illustrate the application of the principles of the invention, it will be understood that the invention may be embodied otherwise without departing from such principles.

What is claimed is:

1. A gas generator particularly for the inflation of inflatable protective bags for safety systems of vehicles, comprising a tubular central part having an outer wall, an annular substantially S-shaped wall member having a bottom forming wall portion, an intermediate wall portion connected to the bottom forming wall portion, an outer casing wall portion, and a mid-web wall portion connected between said outer casing wall portion and said intermediate wall portion, said bottom forming wall portion having an inner edge joined to the outer wall of said central tubular part, an annular cover member having respective radially inner and radially outer peripheral edges joined to said outer wall of said central tubular part and to said intermediate wall portion and enclosing a reaction chamber therebetween overlying said bottom forming wall portion, an outer cover ring extending between and joined to said outer casing wall portion and said intermediate wall portion and enclosing a filter and expansion chamber therebetween, said outer casing wall portion having a plurality of outlet ports therein for the outflow of the generated gases, said intermediate wall portion having at least one opening therein communicating said reaction chamber with said filter and expansion chamber for the flow of reaction gases from the reaction chamber into the filter and expansion chamber and then through the outlet ports of said outer casing wall portion.

2. A gas generator according to claim 1 including an ignition device in said tubular central part, a reaction gas generating material in said reaction chamber, said generator being formed by parts which are cold formed and welded together.

3. A gas generator according to claim 1, wherein said outer casing wall portion is of substantially U-shaped cross section including said intermediate wall portion on one side and an outer casing wall portion spaced radially outwardly thereof containing said outlet ports.

4. A gas generator according to claim 1 wherein said annular substantially S-shaped wall member comprises a deep drawn sheet metal part with a part thereof forming said outer casing wall portion having a plurality of punched areas forming said outlet ports.

5. A gas generator according to claim 1 wherein said annular substantially S-shaped wall member is joined to said tubular central part and to said outer annular cover members.

6. A gas generator according to claim 1 wherein said S-shaped member with said annular cover member and said tubular central part form a toroidal structure defining said reaction chamber.

7. A gas generator according to claim 1, wherein there are a plurality of circumferentially spaced outlet parts in said outer casing wall portion extending substantially from the bottom thereof up to the top thereof, where the outer casing wall portion is joined to said mid-web wall portion which has a portion of the outlet ports therein.

* * * * *